United States Patent
Thalhammer et al.

(10) Patent No.: US 12,029,226 B2
(45) Date of Patent: Jul. 9, 2024

(54) CONCENTRATE FOR PREPARING A DRINKABLE SOLUTION (II)

(71) Applicant: Alzchem Trostberg GmbH, Trostberg (DE)

(72) Inventors: Franz Thalhammer, Trostberg (DE); Gisela Vohburger, Trostberg (DE); Olivia Müller, Markt Schwaben (DE)

(73) Assignee: Alzchem Trostberg GmbH, Trostberg (DE)

( * ) Notice: Subject to any disclaimer, the term of this patent is extended or adjusted under 35 U.S.C. 154(b) by 0 days.

(21) Appl. No.: 17/631,165

(22) PCT Filed: Jul. 17, 2020

(86) PCT No.: PCT/EP2020/070261
§ 371 (c)(1),
(2) Date: Jan. 28, 2022

(87) PCT Pub. No.: WO2021/028149
PCT Pub. Date: Feb. 18, 2021

(65) Prior Publication Data
US 2022/0295829 A1    Sep. 22, 2022

(30) Foreign Application Priority Data

Aug. 9, 2019  (DE) .................. 10 2019 121 526.9

(51) Int. Cl.
| | | |
|---|---|---|
| *A23K 20/142* | (2016.01) | |
| *A23K 20/10* | (2016.01) | |
| *A23K 20/105* | (2016.01) | |
| *A23K 50/30* | (2016.01) | |
| *A23K 50/75* | (2016.01) | |

(52) U.S. Cl.
CPC ............ *A23K 20/142* (2016.05); *A23K 20/10* (2016.05); *A23K 20/105* (2016.05); *A23K 50/30* (2016.05); *A23K 50/75* (2016.05)

(58) Field of Classification Search
CPC ...... A23K 20/142; A23K 50/30; A23K 50/75; A23K 20/10; A23K 20/105
See application file for complete search history.

(56) References Cited

U.S. PATENT DOCUMENTS

| | | |
|---|---|---|
| 2,620,354 A | 12/1952 | Vassel et al. |
| 2,654,779 A | 10/1953 | Vassel et al. |
| 2008/0161387 A1 | 7/2008 | Gastner et al. |
| 2009/0297656 A1 | 12/2009 | Gastner et al. |
| 2012/0141383 A1* | 6/2012 | Gastner .................. A23L 33/175 514/565 |
| 2012/0238629 A1 | 9/2012 | Gastner et al. |

FOREIGN PATENT DOCUMENTS

| | | |
|---|---|---|
| CN | 106361736 A | 2/2017 |
| JP | 6054320 A | 3/1985 |
| WO | 2000059528 A1 | 10/2000 |
| WO | 2005120246 A1 | 12/2005 |
| WO | 2006092298 A1 | 9/2006 |
| WO | 2007014756 A1 | 2/2007 |
| WO | 2007098952 A1 | 9/2007 |
| WO | 2009012960 A2 | 1/2009 |

OTHER PUBLICATIONS

"solution." In The Chambers Dictionary, by C.M. Schwarz. 13th ed. Chambers Harrap, 2015, Available at: https://search.credoreference.com/content/entry/chambdict/solution/0?institutionId=743; accessed on Jan. 3, 2023 (Year: 2015).*
Brown et al., "Dissociation Constants", Chapter 14, Determination of Organic Structures by Physical Methods, Academic Press Inc., vol. 1, 1955, pp. 567-662.
International Application No. PCT/EP2020/070261, International Preliminary Report on Patentability mailed Mar. 30, 2021, 10 pages.
International Application No. PCT/EP2020/070261, International Search Report and Written Opinion mailed On Oct. 23, 2020, 12 pages.
Vranes et al., "Experimental and Computational Study of Guanidinoacetic Acid Self-aggregation in Aqueous Solution", Food Chemistry, vol. 237, Dec. 15, 2017, pp. 53-57.
Du et al., "Self-Antibacterial UV-Curable Waterborne Polyurethane with Pendant Amine and Modified by Guanidinoacetic Acid", Journal of Materials Science, vol. 53, No. 1, Jan. 2018, pp. 215-229.
De Miranda et al., "Study on Guanidino-Carboxylate Interactions in Copper(II) Ternary Complexes of Guanidinoacetic Acid with Glutamic and Aspartic Acids", Polyhedron, vol. 22, Issue 2, Jan. 15, 2003, pp. 225-233.
Singh et al., "Determination of formation constants of some mixed complexes of glycocymin and Nitrilotriacetic acid by paper electrophoresis (Cu(II), UO2(II), Co(II), Zn(II), Cd(II)-Nitrilotriacetic acid-Glycocymin System)", Oriental Journal of Chemistry, vol. 24(1), 2008, pp. 283-286.
International Application No. PCT/EP2020/070261, International Preliminary Report on Patentability mailed Feb. 10, 2022, 6 pages.

* cited by examiner

*Primary Examiner* — Emily M Le
*Assistant Examiner* — Carrie Glimm
(74) *Attorney, Agent, or Firm* — Kilpatrick Townsend & Stockton LLP

(57) ABSTRACT

The invention relates to a concentrate for preparing a drinkable solution, containing an N-(aminoiminomethyl)-2-aminoethanoic acid solution which has an N-(aminoiminomethyl)-2-aminoethanoic acid concentration exceeding the known range.

14 Claims, No Drawings

CONCENTRATE FOR PREPARING A DRINKABLE SOLUTION (II)

CROSS REFERENCE TO RELATED APPLICATION

This application is a U.S. national phase of International Patent Application No. PCT/EP2020/070261 filed on Jul. 17, 2020, which claims priority to German Patent Application No. 10 2019 121 526.9, filed in Germany on Aug. 9, 2019. The entire contents of all applications are hereby incorporated herein by this reference.

The present invention relates to a concentrate for preparing a drinkable solution for livestock, which comprises N-(aminoiminomethyl)-2-aminoethanoic acid and formic acid and which has a concentration of N-(aminoiminomethyl)-2-aminoethanoic acid exceeding the known range.

N-(aminoiminomethyl)-2-aminoethanoic acid (CAS No. 352-97-6, molecular formula $C_3H_7N_3O_2$), also known as guanidinoacetic acid, guanidinoacetate, glycocyamine, N-amidinoglycine or N-(aminoiminomethyl)-glycine, is a guanidinocarboxylic acid with a variety of applications, including in the synthesis of chemical products, in particular pharmaceuticals (cf. WO 2000/059528 A1), for direct use as a pharmaceutical agent in renal diseases (cf. JPS 6054320 A) or neurodegenerative diseases (cf. CN 106361736 A), in the preparation of polymers (cf. Du, Shuo et. al., Journal of Materials Science (2018), 53(1), 215-229) and as a complexing agent for metals (cf. Lopes de Miranda et. al, Polyhedron (2003), 22(2), 225-233 and Singh, Padmakshi et. al, Oriental Journal of Chemistry (2008), 24(1), 283-286).

N-(aminoiminomethyl)-2-aminoethanoic acid can be prepared, for example, according to Strecker, M. (Jahresber. Fortschr. Chem. Verw. (1861), 530) from glycine by reaction with cyanamide. Alternatively, N-(aminoiminomethyl)-2-aminoethanoic acid can be prepared, for example, by reacting glycine with S-methylisothiourea iodide using potassium hydroxide as base (see U.S. Pat. No. 2,654,779 A). The reaction of chloroacetic acid with ammonia to form glycine hydrochloride and its further reaction with cyanamide are also described (cf. U.S. Pat. No. 2,620,354 A).

Various studies have also shown, inter alia, that the use of N-(aminoiminomethyl)-2-aminoethanoic acid during breeding, during keeping or in the fattening of poultry or pigs results in a feed saving, an improvement in feed intake and/or an increase in the fattening performance. Thus, the international patent applications WO 2005/120246 A1, WO 2006/092298 A1, WO 2007/014756 A1, WO 2007/098952 A1 and WO 2009/012960 A2 describe feeds or feed additives based on N-(aminoimino-methyl)-2-aminoethanoic acid as well as salts and solutions of N-(aminoimino-methyl)-2-aminoethanoic acid.

N-(aminoimino-methyl)-2-aminoethanoic acid has been available on the market for some time and is approved as a feed additive in poultry and pig fattening. As a feed additive, for example for broilers, N-(aminoiminomethyl)-2-aminoethanoic acid is used in an amount of 600 mg/kg feed (0.06 wt. % based on the feed). In this application, the N-(aminoimino-methyl)-2-aminoethanoic acid is added as a solid or solid composition to the feed to be administered. In practice, it has been found that a targeted use of the additive requires an effective homogenization of the feed composition due to the relatively small amount of active ingredient to be used.

N-(aminoiminomethyl)-2-aminoethanoic acid also shows other positive effects not only in these species but also in other fattening animals and in animals used for breeding, as well as in animals that perform a particular performance, such as laying hens, or animals used in competitive sports.

In addition to better meat formation, there is above all a positive effect on the general state of health, the immune system and stress resistance. For example, the mortality of animals during heat phases in warm countries is a major problem. It was shown that by feeding N-(aminoiminomethyl)-2-aminoethanoic acid, mortality could be reduced. The animals were able to withstand the heat stress better. The effect is probably due to the creatine formed from N-(aminoiminomethyl)-2-aminoethanoic acid, which leads to an improved supply of water to the particularly affected tissue. In phases of high ambient temperatures, the animals often react with a lower food intake but increased drinking.

Animals also have an increased energy requirement during stress due to transport, change of barn or after illness, which can be covered by the administration of N-(aminoiminomethyl)-2-aminoethanoic acid.

In all these cases, the possibility of flexible administration of N-(aminoiminomethyl)-2-aminoethanoic acid would be desirable.

Such a possibility could be realized by providing N-(aminoiminomethyl)-2-aminoethanoic acid to the animals as a drinkable solution. Administration could be performed via the drinking water alone or in addition to a basic supply via a solid feed.

In the recent years, a number of drinking systems have been developed for the fattening of poultry and pigs for the continuous provision of water for feeding the animals. The common feature of these drinking systems is that the water is provided to the animals ad libitum, i.e. at their free disposal, but in a controlled and traceable manner with regard to the amount administered. These drinking systems can be used to administer both veterinary active agents and feed additives to the animals. Thus, a method of administering veterinary active agents and feed additives using these drinking systems has also become established in the recent past. A requirement for this is that the active agents and feed additives are water-soluble.

Due to the low solubility of N-(aminoiminomethyl)-2-aminoethanoic acid in water (approx. 0.4% at 25° C.), an aqueous solution as a concentrate is not applicable. On the other hand, the use of a suspension always involves the risk of segregation and can thus lead to undesirable or even harmful incorrect dosing.

Thus, there is an increased requirement on the part of users for a formulation of N-(aminoiminomethyl)-2-aminoethanoic acid that has improved solubility. To address this issue, salts, addition and complex compounds of N-(aminoiminomethyl)-2-aminoethanoic acid have been proposed which shall have improved solubility in water. The disadvantage thereof is that salts of organic acids do not form, or only partially form, in equilibrium due to the high pKs values compared to the pKs value of N-(aminoiminomethyl)-2-aminoethanoic acid and cannot be isolated. All derivatives of N-(aminoiminomethyl)-2-aminoethanoic acid with organic acids also further have insufficient solubility in water. Only strong inorganic acids such as hydrochloric acid, sulfuric acid or nitric acid form salts. These are also much more soluble, but have the disadvantage that they themselves react very strongly acidic and are very corrosive to many materials. The acceptance of these salts by the animals is also uncertain.

A particular problem in the production and application of liquid formulations is the microbial growth and the biological degradation of the contained valuables. Also N-(aminoiminomethyl)-2-aminoethanoic acid in moist or dissolved form is subject to microbial degradation.

The problem of the invention is therefore to provide N-(aminoiminomethyl)-2-aminoethanoic acid in a liquid solution which has an increased concentration of N-(aminoiminomethyl)-2-aminoethanoic acid compared to the known liquid forms. This liquid form should be applicable for feeding fattening animals without extensive further processing, does not have the above-mentioned disadvantages and does not contain any components which are not admissible for fattening.

These problems are solved by a concentrate according to claim 1. Preferred embodiments of the invention are given in the sub claims, which may optionally be combined with each other.

Thus, according to a first embodiment, a concentrate is subject matter of the present invention comprising a solution comprising N-(aminoiminomethyl)-2-aminoethanoic acid itself, wherein the solution comprises, based on the total weight of the solution:
 a) 0.5 to 33.0 wt. % of N-(aminoiminomethyl)-2-aminoethanoic acid, and
 b) 0.1 to 99.5 wt. % of formic acid, and
wherein ingredient a) is present in the solution in dissolved form.

According to the invention, the concentrate provides these amounts of ingredients at 25° C. Furthermore, the ingredients of the concentrate according to the present invention supplement to 100 wt. % in any case, regardless of the type and number of ingredients.

The solubility of a substance indicates the extent to which a pure substance can be dissolved in a solvent. It refers to the property of the substance to dissolve under homogeneous distribution in the solvent. N-(aminoiminomethyl)-2-aminoethanoic acid has a low solubility in water. Thus, a saturated solution of N-(aminoiminomethyl)-2-aminoethanoic acid in water has a concentration of about 3.5 g/l (20° C.) and 4.0 g/l (25° C.), respectively. In the context of the present invention, it has now been found that N-(aminoiminomethyl)-2-aminoethanoic acid has a significantly higher solubility in formic acid of various concentrations compared to known solutions of N-(aminoiminomethyl)-2-aminoethanoic acid. Thus, it was shown that N-(aminoiminomethyl)-2-aminoethanoic acid in formic acid-containing solutions can exhibit a solubility up to 80 times higher compared to aqueous solutions without further ingredients. The concentration of N-(aminoiminomethyl)-2-aminoethanoic acid in such solutions is up to 330 g/l (25° C.). Thus, a concentrate can be provided which is excellently applicable in the fattening of poultry. In addition to the desired feed additive N-(aminoimino-methyl)-2-aminoethanoic acid, the solution contains only formic acid, which in turn has no harmful effect on the fattening performance or the health of the animals.

The invention, in addition to the surprising effect of excellent solubility in formic acid, is further based on the preparation of a liquid concentrate of dissolved N-(aminoiminomethyl)-2-aminoethanoic acid in formic acid or a mixture containing formic acid as an essential ingredient and its use as an additive to animals' watering place.

This concentrate, which is easy and accurate to dose to drinking water and allows even very small concentrations to be adjusted safely, can have an exceptionally high content of N-(aminoiminomethyl)-2-aminoethanoic acid. It can be used with the usual equipment for drinking water supply in livestock and is readily and constitutional taken up by the animals.

A concentrate for supplying N-(aminoiminomethyl)-2-aminoethanoic acid to animals via drinking water is prepared by dissolving N-(aminoiminomethyl)-2-aminoethanoic acid in a solution containing formic acid as an essential component.

According to the present invention, the formic acid may be used in pure form or in dilute form. Thus, according to a preferred embodiment, it is also subject matter of the present invention to provide a concentrate comprising a solution comprising N-(aminoiminomethyl)-2-aminoethanoic acid, wherein the solution contains based on the total weight of the solution:
 a) 0.5 to 33.0 wt. % of N-(aminoiminomethyl)-2-aminoethanoic acid, and
 b) 0.1 to 99.5 wt. % of formic acid, and
 c) 0 to 99.4 wt. % of water, and
wherein ingredient a) is present in the solution in dissolved form.

According to the present invention, the contents refer to the content in solution at 25° C.

Preferably, the solution comprises, based on the total weight of the solution c), 0.1 to 95.0 wt. % of water. Further preferably, the solution comprises, based on the total weight of the solution c), from 0.1 to 50.0 wt. %, preferably from 0.1 to 40.0 wt. %, and further preferably from 0.1 to 30.0 wt. % of water.

Further preferred, the concentrate comprises a solution comprising N-(aminoiminomethyl)-2-aminoethanoic acid, formic acid and optionally water, wherein the solution comprises, based on the total weight of the solution, a proportion a) of from 1.0 to 33.0 wt. %, more preferably from 2.0 to 33.0 wt. %, further preferably from 5.0 to 33.0 wt. % and most preferably from 8.0 to 33.0 wt. % of N-(aminoiminomethyl)-2-aminoethanoic acid.

Also embodiments of the invention are contained in which the solution comprises, based on the total weight of the solution, a proportion a) of from 1.0 to 30.0 wt. %, in particular from 2.0 to 20.0 wt. % and more specifically from 3.0 to 10 wt. % of N-(aminoiminomethyl)-2-aminoethanoic acid. A content of 10.0 to 20.0 wt. % of N-(aminoiminomethyl)-2-aminoethanoic acid is particularly preferred.

Further preferred, the concentrate comprises a solution comprising N-(aminoiminomethyl)-2-aminoethanoic acid, formic acid and optionally water, wherein the solution comprises, based on the total weight of the solution, a proportion b) preferably of at least 0.5 wt. %, more preferably of at least 2.0 wt. %, more preferably of at least 5.0 wt. % and particularly preferably of at least 10 wt. %, more preferably of at least 20 wt. % and in particular of at least 30 wt. % of formic acid and, simultaneously or independently thereof, preferably of at most 90.0 wt. %, more preferably of at most 80 wt. % by weight, more preferably of at least 70 wt. % and particularly preferably of at most 60 wt. % of formic acid.

In each case, and irrespective of the proportions of water or formic acid, the N-(aminoiminomethyl)-2-aminoethanoic acid is present in the solution in dissolved form.

According to the invention, N-(aminoiminomethyl)-2-aminoethanoic acid is dissolved in formic acid-containing formulations. It was surprisingly found that formic acid and also mixtures containing formic acid in appreciable proportions and used for drinking water treatment in agricultural farms are suitable for dissolving N-(aminoiminomethyl)-2-aminoethanoic acid in high concentrations. In particular, a comparison of the solubility of N-(aminoiminomethyl)-2-aminoethanoic acid in other comparable acids shows the advantages of formic acid (see Examples). Thus, N-(aminoiminomethyl)-2-aminoethanoic acid hardly dissolves in acetic acid or in propionic acid. Only when lactic acid is used, larger amounts of N-(aminoiminomethyl)-2-aminoethanoic acid can be dissolved.

In addition to the formic acid and optionally water, the solution may thus preferably also contain further ingredients. Thus, the solution may contain as a further ingredient d) a further acid or its salt.

Thus, according to a further embodiment, a concentrate is also subject matter of the present invention, the solution of which comprises d) as a further ingredient:
  d) 0.1 to 55 wt. % of at least one other acid or a salt thereof.

Inorganic acids as well as organic acids or their salts may be used. Particularly preferably, the solution may contain a further acid selected from the group consisting of acetic acid, propionic acid, sorbic acid, lactic acid, pyruvic acid or phosphoric acid. As salts of these acids, further preferably a salt selected from the group of alkaline or alkaline earth salts of these acids may be used. Sodium lactate, sodium formate, sodium acetate and sodium propionate are particularly preferred.

Thus, according to a further embodiment, it is also subject matter of the present invention to provide a concentrate comprising a solution comprising N-(aminoiminomethyl)-2-aminoethanoic acid, lactic acid and optionally water, wherein the solution comprises based on the total weight of the solution:
  a) 0.5 to 5.0 wt. % of N-(aminoiminomethyl)-2-aminoethanoic acid, and
  b) 0.1 to 99.5 wt. % of lactic acid, and
  c) 0 to 99.4 wt. % of water, and
wherein ingredient a) is present in the solution in dissolved form.

Preferred herein is a concentrate comprising a solution comprising N-(aminoiminomethyl)-2-aminoethanoic acid, lactic acid and water, wherein the solution comprises based on the total weight of the solution:
  a) 0.5 to 5.0 wt. % of N-(aminoiminomethyl)-2-aminoethanoic acid, and
  b) 10 to 99.4 wt. % of lactic acid, and
  c) 0.1 to 89.5 wt. % of water, and
wherein ingredient a) is present in the solution in dissolved form.

According to the invention, this concentrate also provides these amounts of ingredients at 25° C. Furthermore, the ingredients of this concentrate according to the present invention supplement to 100 wt. % in any case, regardless of the type and number of ingredients.

The increased solubility in lactic acid is also completely surprising and unpredictable.

According to another embodiment of the present invention, the solution may also comprise further ingredient selected from the group consisting of formulation adjuvants and/or modifiers.

Thus, a concentrate comprising a solution comprising e) as a further ingredient also is subject matter of the invention:
  e) 0.1 to 5 wt. % of at least one formulation adjuvant and/or modifier.

Examples of modifiers are glycols, oils, flavor additives.

According to a further embodiment of the present invention, the concentrate may also comprise a further ingredient selected from the group consisting of feed additives admitted in feed, said further ingredient being in particular selected from the group consisting of salts, trace elements and amino acids.

Thus, a concentrate is also subject matter of the invention comprising a solution comprising as a further ingredient f): 0.1 to 30 wt. % of a further ingredient selected from the group of feed additives admitted in feed, the further ingredient being selected from the group consisting of salts, trace elements and amino acids.

Examples of admitted feed additives are trace elements and amino acids, in particular lysine, methionine, glycine, tyrosine and tryptophan.

Examples of salts are calcium chloride, sodium formate, sodium acetate.

These feed additives may be included, but they are not necessarily included. Thus, according to a particular embodiment, a concentrate consisting of the solution is subject matter of the present invention. Very particularly preferred is a concentrate consisting of the solution, the solution itself consisting of ingredients a), b) and optionally c), and optionally d) and optionally e) and optionally f).

These concentrates are excellently suitable for preparing a drinkable solution for pigs and poultry. Thus, the use of a concentrate of the type described herein for preparing a drinkable solution for pigs or poultry is covered by the invention.

The solubility of N-(aminoiminomethyl)-2-aminoethanoic acid in the mixtures depends on the proportion of free formic acid. In a mixture of formic acid/propionic acid/water of 40/40/20 (wt. %) a solubility of 12.3% was determined at 25° C. (cf. Examples).

Thus, a concentrate can be provided that is excellently applicable in the fattening of poultry and pigs. In addition to the desired feed additive N-(aminoimino-methyl)-2-aminoethanoic acid, the solution contains only ingredients that are already admitted in fattening and have no harmful effect on the fattening performance or the health of the animals.

The maximum content of N-(aminoiminomethyl)-2-aminoethanoic acid in the mixtures depends on the proportion of free formic acid, but can be adjusted as desired below the saturation limit. It is in the range of 1-33 wt. %, particularly preferred at 10-20 wt. %.

N-(aminoiminomethyl)-2-aminoethanoic acid is a guanidinocarboxylic acid which has an isoelectric point at pH 8.5. Depending on the pH of a solution, the compound may thus be present in the solution as an inner salt with charge equalization or as a cation or as an anion. According to the invention, the N-(aminoiminomethyl)-2-aminoethanoic acid in the solutions according to the invention is present predominantly in zwitterionic form and not as a formate salt neutralized by a charge localized outside the guanidinocarboxylic acid.

This becomes clear by comparing the pKs values.

pKs value of the acid group in N-(aminoiminomethyl)-2-aminoethanoic acid: 3.3+/−0.1 (calculated, using Advanced Chemistry Development (ACD/Labs) Software V11.02 (© 1994-2019 ACD/Labs).

pKs value formic acid: 3.77 (H. C. Brown et al. Determination of Organic Structures by Physical Methods, Academic Press, New York, 1955).

pKs value lactic acid: 3.90+/−0.11 (Römpp Online, Georg Thieme Verlag). Formic acid and lactic acid are thus weaker acids than the acid group in N-(aminoiminomethyl)-2-aminoethanoic acid.

Even when a solution of N-(aminoiminomethyl)-2-aminoethanoic acid is evaporated in formic acid under gentle conditions in vacuum, only N-(aminoiminomethyl)-2-aminoethanoic acid and not the formic acid salt thereof remains as residue.

Thus, according to the invention, N-(aminoiminomethyl)-2-aminoethanoic acid is present in solution predominantly as such and not as a salt or complex. A concentrate can be provided which has a concentration of active agent exceeding the known range. In practice, this method of provision has immense advantages. The fact that N-(aminoiminomethyl)-2-aminoethanoic acid has a significantly better solubility in formic acid-containing solutions than in water or other comparable acids is surprising and represents the actual core of the invention.

It is therefore appropriate to dissolve N-(aminoiminomethyl)-2-aminoethanoic acid in liquid formulations based on formic acid in order to use the concentrate for the preparation of a drinkable solution for fattening animals.

Preferred is an aqueous mixture of N-(aminoiminomethyl)-2-aminoethanoic acid and formic acid with a concentration of 0.5-100%, which may contain further organic or inorganic acids, salts, trace elements, amino acids and modifiers admitted for animal feeding. These additional ingredients are not essential to the invention and only show the possibilities of application.

Examples of further acids are propionic acid, acetic acid, sorbic acid, lactic acid, pyruvic acid or phosphoric acid.

Examples of salts are calcium chloride, sodium formate, sodium acetate.

Examples of amino acids are lysine, methionine, glycine, tyrosine, tryptophan.

Examples of modifiers are glycols, oils, flavor additives.

Preferably, the formic acid solution for mixing with N-(aminoiminomethyl)-2-aminoethanoic acid has a content of 40-80 wt. %.

Thus, also a concentrate is subject matter comprising an aqueous solution comprising N-(aminoiminomethyl)-2-aminoethanoic acid, formic acid and further organic or inorganic acids, salts, trace elements, amino acids and modifiers admitted for use in animal feeding.

It is also essential to the invention that N-(aminoiminomethyl)-2-aminoethanoic acid in the concentrate and also in the drinkable dilution is not degraded by biological microbes. The commercially available formulations based on formic acid are used in drinking water systems precisely to keep them sterile or to kill microbes.

The concentrates containing formic acid have a very low pH value. The addition of N-(aminoiminomethyl)-2-aminoethanoic acid only effects a low buffering effect. Typically, formic acid-containing concentrates are used specifically to adjust the pH value in the drinkable dilution slightly acidic. For this purpose, defined amounts of the concentrate are added to the drinking water via dosing devices. The mixing ratio is in the order of 1-2 parts concentrate to 1000 parts water.

This has various positive effects on the digestion of the fattening animals. The amount of N-(aminoiminomethyl)-2-aminoethanoic acid does not influence this effect.

Fattening animals consume on average about twice as much water as feed. A concentration of N-(aminoiminomethyl)-2-aminoethanoic acid in drinking water should therefore be in the range of 300 mg/litre if N-(aminoiminomethyl)-2-aminoethanoic acid is to be administered exclusively via water. The solubility of N-(aminoiminomethyl)-2-aminoethanoic acid in water is higher about a factor of 10. Therefore, no solid is precipitated when adding to water.

For concentrates of N-(aminoiminomethyl)-2-aminoethanoic acid in formic acid-containing solutions, this means that a concentration of >10 wt. % is required for this case in order to achieve an exclusive provision of the usual amount of N-(aminoiminomethyl)-2-aminoethanoic acid. In the case of a supplementary administration, lower amounts are also applicable.

With formic acid, also in commercial mixtures for the treatment of drinking water, this concentration is achieved, whereas it is not achieved with other organic acids. The tremendous difference in solubility cannot be explained by the acid strength. It was even unexpected for a skilled person.

Salts of N-(aminoiminomethyl)-2-aminoethanoic acid with the inorganic acids hydrochloric acid and sulphuric acid also have a high solubility in water in some cases, but they are corrosive to the installations permanently at the usual pH values and have disadvantages with regard to the germicidal effect, as well as in the acceptance by animals. They are also currently not yet admitted for feeding.

Dissolving N-(aminoiminomethyl)-2-aminoethanoic acid in formic acid or in existing acid formulations has the advantage that any mixtures can be produced and the farmer does not have to provide additional containers. There is also no need for additional, expensive packaging (for liquids).

EXAMPLES

Example 1: General Approach for the Determination of the Solubility of N-(aminoiminomethyl)-2-aminoethanoic Acid in Formic Acid N-(aminoiminomethyl)-2-aminoethanoic acid comprising 99.5% was ground to a fine powder in a mortar. 50 g of formic acid was placed in a stirred beaker and thermostatized to 25±2° C. N-(aminoiminomethyl)-2-aminoethanoic acid was introduced into this acid in portions of about 250 milligrams until the solid did not dissolve clearly anymore within 30 minutes. Solubility was determined by the amount introduced at which a clear solution was still obtained. An undissolved amount of about 50 mg is still clearly visible. Thus, the relative inaccuracy of this method is 0.5 wt. %. The values listed in Table 1 were obtained.

TABLE 1

Solubility of N-(aminoiminomethyl)-2-aminoethanoic acid in formic acid of different concentrations

| 50 g Acid (content in %) | Amount dissolved N-(aminoiminomethyl)-2-aminoethanoic acid in g | Corresponds to solubility in wt. % (based on the solution) |
| --- | --- | --- |
| Formic acid 100% | 24.60 | 32.9 |
| Formic acid 80% in water | 15.75 | 23.9 |
| Formic acid 40% in water | 5.40 | 9.7 |
| Formic acid 5% in water | 1.05 | 2.1 |

The results show that the solubility of N-(aminoiminomethyl)-2-aminoethanoic acid in formic acid depends on the concentration. However, the dissolved amount of N-(aminoimino-methyl)-2-aminoethanoic acid in the formic acid significantly exceeds the maximum dissolved amount in water (0.4 g in 100 ml of water at 25° C., corresponding to 0.4 wt. %).

Example 2: Solubility of N-(aminoiminomethyl)-2-aminoethanoic Acid in Further Acids Analogous to the approach in Example 1, N-(aminoiminomethyl)-2-aminoethanoic acid was added to acids listed below and the solubility was determined. The values listed in Table 2 were obtained.

TABLE 2

Solubility of N-(aminoiminomethyl)-2-aminoethanoic acid in various acids

| 50 g Acid (content in %) | Amount dissolved N-(aminoiminomethyl)-2-aminoethanoic acid in g | Corresponds to solubility in wt. % (based on the solution) |
|---|---|---|
| Acetic acid 80% in water | <0.5 | <1 |
| Propionic acid 80% in water | <0.5 | <1 |
| Lactic acid 80% in water | 2.45 | 4.7 |
| Pyruvic acid 100% | 0.25 | <1 |
| Hydrochloric acid 6% in water | 10.4 | 17.2 (dissolved as hydrochloride) |
| Sulphuric acid 9% in water | 3.60 | 6.7 (dissolved as sulphate, solid is precipitated again when standing for a longer period of time) |
| Ascorbic acid 10% in water | <0.5 | <1 |
| Citric acid 20% in water | 1.1 | 2.1 |

The result shows that N-(aminoiminomethyl)-2-aminoethanoic acid is much less soluble in other acids than in formic acid. Only in lactic acid or in strong inorganic acids such as hydrochloric acid a high solubility given, then however including salt formation.

Example 3: Solubility of N-(aminoiminomethyl)-2-aminoethanoic Acid in Mixtures of Formic Acid with Further Acids Mixtures were prepared from formic acid and further organic acids.

Analogous to the approach in Example 1, N-(aminoiminomethyl)-2-aminoethanoic acid was added to the mixtures listed below and the solubility was determined. The values listed in Table 3 were obtained.

TABLE 3

Solubility of N-(aminoiminomethyl)-2-aminoethanoic acid in acid mixtures

| 50 g acid mixture (ingredients in wt. % based on the acid mixture) | Amount dissolved N-(aminoiminomethyl)-2-aminoethanoic acid in g | Corresponds to solubility in wt. % (based on the solution) |
|---|---|---|
| *Formic acid 64% *Propionic acid 25% Water 11% | 12.5 | 20.0 |
| *Formic acid 42.5% *Propionic acid 50% Water 7.5% | 5.4 | 9.7 |
| *Formic acid 40% *Propionic acid 40% Water 20% | 7.0 | 12.3 |
| *Formic acid 40% *Acetic acid 40% Water 20% | 6.9 | 12.1 |
| *Formic acid 40% *Lactic acid 40% Water 20% | 7.2 | 12.6 |

*the concentration of the respective acid is 100%

The result shows that the solubility of N-(aminoiminomethyl)-2-aminoethanoic acid in mixtures of formic acid and further acids depends on the content of formic acid.

Example 4: Solubility of N-(aminoiminomethyl)-2-aminoethanoic Acid in Mixtures of Formic Acid with Further Acids and Buffer Substances Mixtures were prepared from formic acid and further organic acids as well as sodium salts of these acids as buffer substances.

Analogous to the approach in Example 1, N-(aminoiminomethyl)-2-aminoethanoic acid was added to the mixtures listed below and the solubility was determined. The values listed in Table 4 were obtained.

TABLE 4

Solubility of N-(aminoiminomethyl)-2-aminoethanoic acid in acid mixtures containing buffer substances

| 50 g mixture (contents of ingredients in wt. % based on the mixture) | Dissolved amount of N-(aminoiminomethyl)-2-aminoethanoic acid in g | Corresponds to solubility in wt. % (based on the solution) |
|---|---|---|
| *Formic acid 39% Na-formate 23% *Propionic acid 18% Water 20% | 1.3 | 2.5 |
| *Formic acid 20% *Propionic acid 35% Na-formate 21% Na propionate 4% Water 20% | 2.2 | 4.2 |
| *Formic acid 50% Na-lactate 20% Water 30% | 3.75 | 7.0 |

*the concentration of the respective acid is 100%

Example 5: Determination of the Dissolved Form of N-(aminoiminomethyl)-2-aminoethanoic Acid in Formic Acid 6.0 g of N-(aminoiminomethyl)-2-aminoethanoic acid was dissolved in 20 g of formic acid (100%) at room temperature and this solution was gently evaporated to dryness on a rotary evaporator at 60° C. and a vacuum of 30 mbar. The isolated solid (5.96 g) was 98.3% N-(aminoiminomethyl)-2-aminoethanoic acid. The IR spectrum was identical to the spectrum of the original substance.

Furthermore, 10.0 g of N-(aminoiminomethyl)-2-aminoethanoic acid were stirred in 20 g of formic acid (100%) for one hour at room temperature. The undissolved portion was filtered off and dried at 60° C. in vacuum. It consisted of 98.6% N-(aminoiminomethyl)-2-aminoethanoic acid. The IR spectrum was identical to the spectrum of the original substance.

The results show that N-(aminoiminomethyl)-2-aminoethanoic acid dissolves in formic acid without the formation of a salt or an addition compound.

Example 6: Determination of the Form of N-(aminoiminomethyl)-2-aminoethanoic Acid in Hydrochloric Acid (Comparative Example)

The solution of N-(aminoiminomethyl)-2-aminoethanoic acid in hydrochloric acid from Example 3 was gently evaporated to dryness on a rotary evaporator at 60° C. and a vacuum of about 30 mbar. The solid obtained consisted of the hydrochloride of N-(aminoiminomethyl)-2-aminoethanoic acid.

The result shows that a salt is formed from N-(aminoiminomethyl)-2-aminoethanoic acid in strong acids in contrast to formic acid.

Example 7: Production of Treated Drinking Water

Mixtures of formic acid with further acids and partly buffer substances were prepared. N-(aminoiminomethyl)-2-aminoethanoic acid (GAA) was added to these mixtures until just below the solubility limit at 25° C. and dissolved clear.

From this solution, 0.1% (dilution 1:1000) and 0.2% (dilution 1:500) were added to tap water. In all cases, a completely clear drinking water was obtained. The resulting pH values are shown in Table 5 below.

TABLE 5 pH values of various drinkable solutions containing N-(aminoiminomethyl)-2-aminoethanoic acid prepared from concentrates and drinking water

| Concentrate (content of ingredients in wt. % based on the concentrate) | pH-value at dilution 1:1000 | pH value at dilution 1:500 |
|---|---|---|
| *Formic acid 61% N-(aminoiminomethyl)-2-aminoethanoic acid 24% Water 15% | 3.07 | 2.95 |
| *Formic acid 35% *Propionic acid 35% N-(aminoiminomethyl)-2-aminoethanoic acid 12.5% Water 17.5% | 3.14 | 2.97 |
| *Formic acid 47% Na lactate 18% N-(aminoiminomethyl)-2-aminoethanoic acid 7% Water 28% | 3.10 | 2.97 |
| *Formic acid 100% | 2.73 | 2.57 |
| *Formic acid 50% Water 50% | 2.88 | 2.73 |

*the concentration of the respective acid is 100%

The table shows that N-(aminoiminomethyl)-2-aminoethanoic acid in mixtures comprising formic acid develops a small buffering effect when diluted to a ready-to-use drinkable solution and the resulting pH values are slightly higher than without N-(aminoiminomethyl)-2-aminoethanoic acid. The proportions of sodium salts of acids have no significant additional effect.

Since the resulting pH values are still acceptable for drinking water but very low, a positive effect can be observed by adding N-(aminoiminomethyl)-2-aminoethanoic acid.

The invention claimed is:

1. A concentrate comprising a solution comprising N-(aminoiminomethyl)-2-aminoethanoic acid wherein the solution comprises, based on the total weight of the solution:
   a) from 8.0 to 33.0 wt. % of N-(aminoiminomethyl)-2-aminoethanoic acid; and
   b) from 30.0 to 90.0 wt. % of formic acid, and
wherein ingredient a) is present in the solution in dissolved form.

2. Concentrate according to claim 1, wherein the solution further comprises:
   c) 0.1 wt. % or more of water.

3. Concentrate according to claim 1, wherein the solution further comprises:
   c) 0.1 to 55 wt. % of at least one further acid or a salt thereof.

4. Concentrate according to claim 3, wherein the acid is selected from the group of acids consisting of acetic acid, propionic acid, sorbic acid, lactic acid, pyruvic acid and phosphoric acid.

5. Concentrate according to claim 3, wherein the salt is selected from the group of alkaline or alkaline earth salts of the acid.

6. Concentrate according to claim 1, wherein the solution further comprises:
   c) 0.1 to 5 wt. % of a total amount of a further ingredient selected from the group consisting of formulation adjuvants and modifiers.

7. Concentrate according to claim 1, wherein the concentrate further comprises:
   c) 0.1 to 30 wt. % of a further feed additive selected from the group consisting of salts, trace elements and amino acids.

8. Concentrate according to claim 2, wherein the solution further comprises:
   d) 0.1 to 55 wt. % of at least one further acid or a salt thereof.

9. Concentrate according to claim 2, wherein the solution further comprises:
   d) 0.1 to 5 wt. % of a total amount of a further ingredient selected from the group consisting of formulation adjuvants and modifiers.

10. Concentrate according to claim 3, wherein the solution further comprises:
    d) 0.1 to 5 wt. % of a total amount of a further ingredient selected from the group consisting of formulation adjuvants and modifiers.

11. Concentrate according to claim 2, wherein the solution further comprises:
    d) 0.1 to 30 wt. % of a further feed additive selected from the group consisting of salts, trace elements and amino acids.

12. Concentrate according to claim 3, wherein the solution further comprises:
    d) 0.1 to 30 wt. % of a further feed additive admitted in feed is-selected from the group consisting of salts, trace elements and amino acids.

13. Concentrate according to claim 6, wherein the solution further comprises:
    d) 0.1 to 30 wt. % of a further feed additive selected from the group consisting of salts, trace elements and amino acids.

14. Concentrate according to claim 1, wherein the solution further comprises:
    c) 0.1 wt. % or more of water;
    d) 0.1 to 55 wt. % of at least one further acid or a salt thereof;
    e) 0.1 to 5 wt. % of a total amount of a further ingredient selected from the group consisting of formulation adjuvants and modifiers; and
    f) 0.1 to 30 wt. % of a further feed additive admitted in feed is selected from the group consisting of salts, trace elements and amino acids.

* * * * *